(12) United States Patent
Conconi

(10) Patent No.: US 6,190,226 B1
(45) Date of Patent: Feb. 20, 2001

(54) DRIP COLLECTING SUPPORT FOR FROZEN CONFECTIONS

(76) Inventor: Riccardo Conconi, Via Carlo Ravizza, 40 20146 Milan (IT)

(*) Notice: Under 35 U.S.C. 154(b), the term of this patent shall be extended for 0 days.

(21) Appl. No.: 09/308,963

(22) PCT Filed: Oct. 5, 1998

(86) PCT No.: PCT/EP98/06331

§ 371 Date: May 27, 1999

§ 102(e) Date: May 27, 1999

(87) PCT Pub. No.: WO99/18011

PCT Pub. Date: Apr. 15, 1999

(30) Foreign Application Priority Data

Oct. 8, 1997 (IT) ............................................. MI970716 U

(51) Int. Cl.⁷ ............................... A23G 9/00; B65D 85/78
(52) U.S. Cl. ............................. 446/73; 294/1.1; 294/5.5; 426/91; 426/104; 426/110; 426/115; 426/134; 426/123; 426/130
(58) Field of Search ..................................... 426/134, 110, 426/115, 122, 123, 104, 91, 112, 421, 130; 446/72, 73, 74; 294/1.1, 5.5

(56) References Cited

U.S. PATENT DOCUMENTS

| D. 119,275 | * | 3/1940 | Lowenstein | 426/104 |
|---|---|---|---|---|
| 1,436,754 | * | 11/1922 | Chadwick | 426/130 |
| 1,599,267 | * | 9/1926 | Amos | 426/130 |
| 1,882,290 | * | 10/1932 | Meagher | 426/134 |
| 1,947,872 | * | 2/1934 | Nolte | 426/110 |
| 2,001,919 | * | 5/1935 | Nolte | 426/134 |
| 2,032,783 | * | 3/1936 | Wood | 426/130 |
| 2,038,576 | * | 4/1936 | Krein | 426/130 |
| 2,150,207 | * | 3/1939 | Currie | 426/123 |
| 2,317,067 | * | 4/1943 | Knaust | 426/110 |
| 2,766,123 | * | 10/1956 | Moubayed | 426/134 |
| 2,803,550 | * | 8/1957 | Ackalusky | 426/134 |
| 2,834,685 | * | 5/1958 | Ferguson | 426/134 |
| 2,946,207 | | 7/1960 | Hulterstrum . | |
| 2,980,039 | * | 4/1961 | Jolly | 426/134 |
| 3,085,883 | * | 4/1963 | Collier | 426/134 |
| 3,088,643 | * | 5/1963 | Dunn | 426/134 |
| 4,226,355 | | 10/1980 | Helfrich . | |
| 4,239,175 | | 12/1980 | Straubinger . | |
| 4,992,283 | | 2/1991 | Shorey . | |
| 5,013,278 | * | 5/1991 | Dixon et al. | 446/73 |
| 5,302,403 | * | 4/1994 | Cook et al. | 426/104 |
| 5,354,191 | | 10/1994 | Bobis . | |
| 5,590,436 | * | 1/1997 | Wright et al. | 446/73 |
| 5,919,071 | * | 7/1999 | McConnell et al. | 446/74 |
| 6,015,328 | * | 1/2000 | Glaser | 446/72 |

FOREIGN PATENT DOCUMENTS

| 3617093 | | 10/1986 | (DE) . | |
|---|---|---|---|---|
| 77473 | * | 4/1954 | (DK) | 426/134 |
| 2618418 | | 1/1989 | (FR) . | |

* cited by examiner

Primary Examiner—Steven Weinstein
(74) Attorney, Agent, or Firm—Guido Modiano; Albert Josif; Daniel O'Byrne

(57) ABSTRACT

A drip collecting support for frozen confections comprising a drip collecting tray shaped body and a handle means having a removable portion comprising a figurine or a toy.

2 Claims, 2 Drawing Sheets

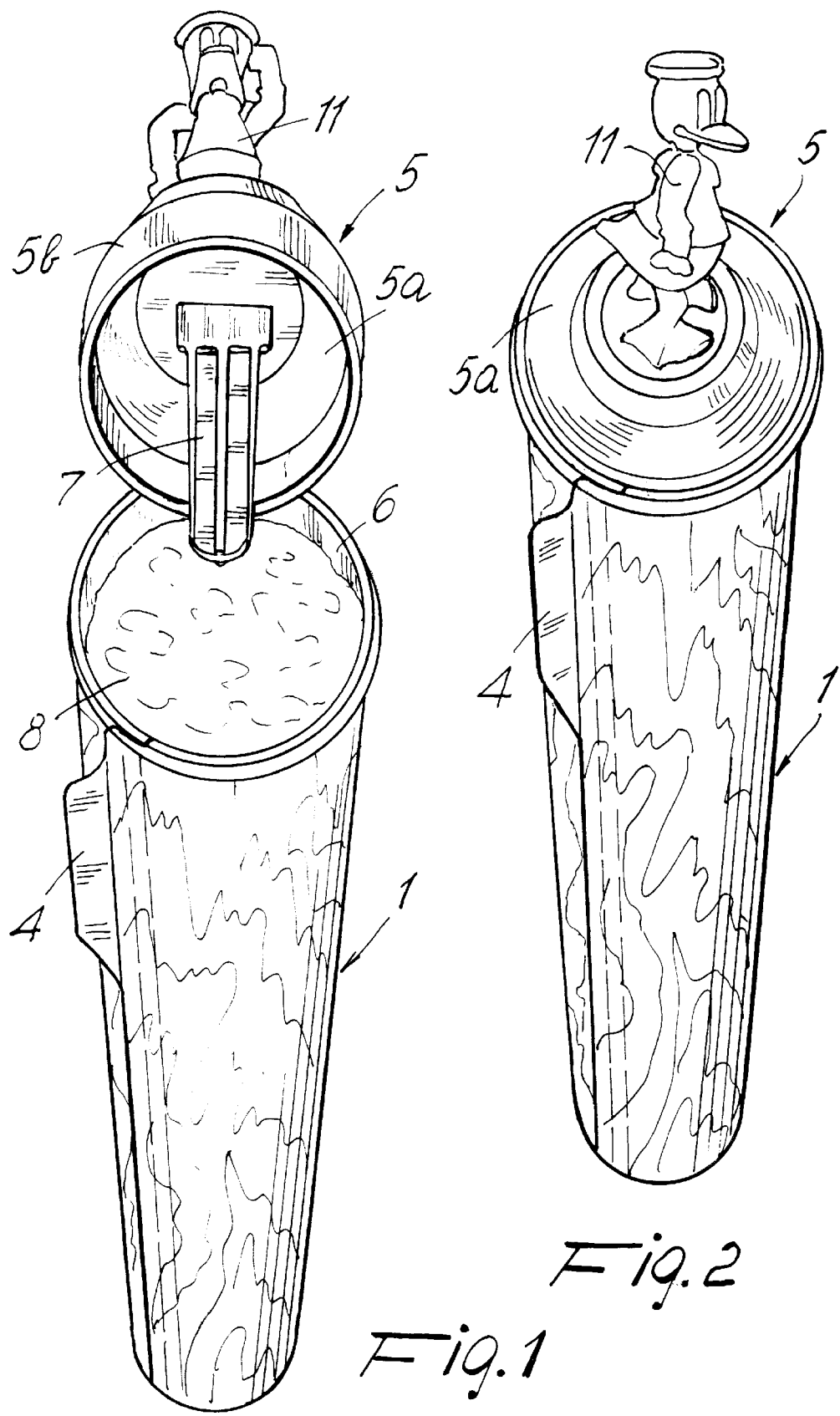

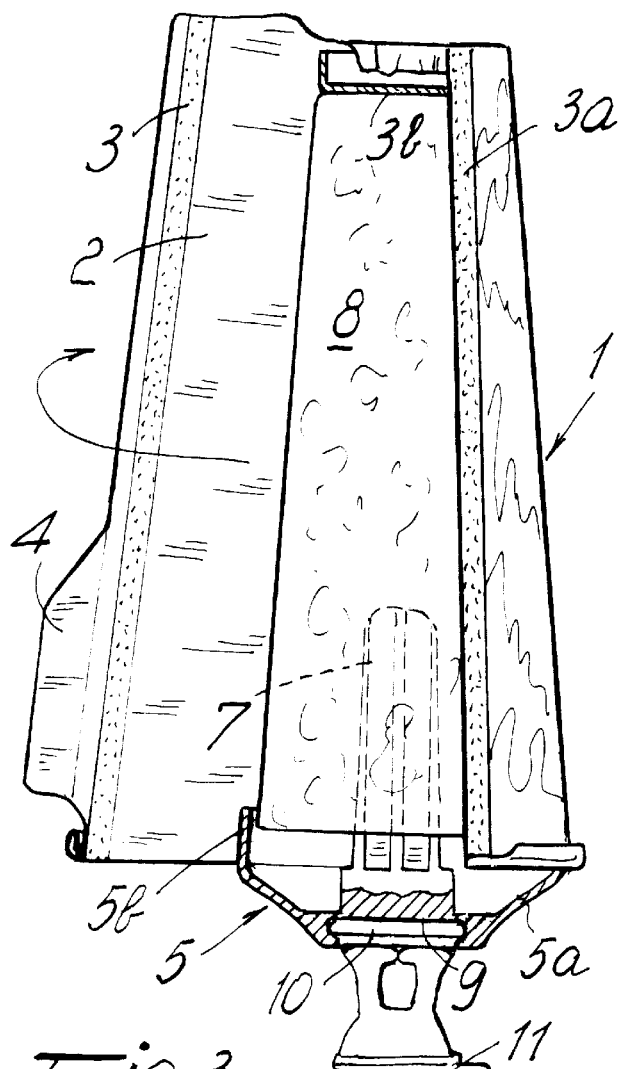
Fig.3
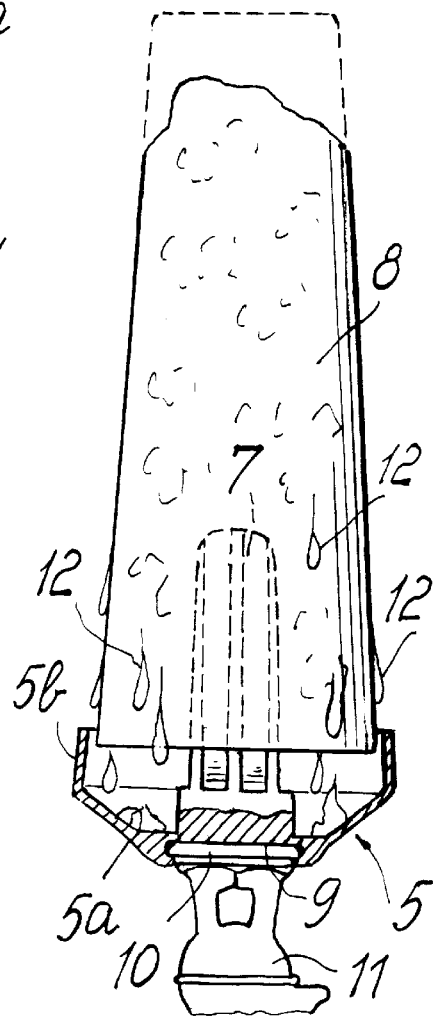
Fig.4
Fig.6
Fig.5
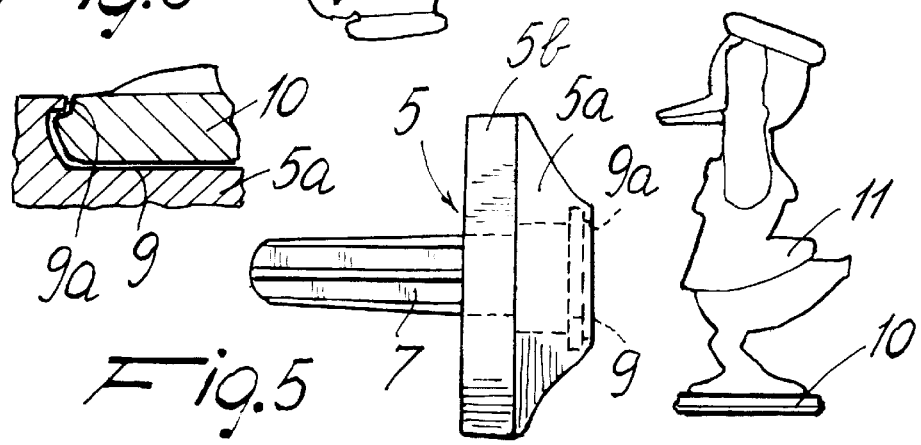

DRIP COLLECTING SUPPORT FOR FROZEN CONFECTIONS

BACKGROUND OF THE INVENTION

The present invention relates to a support shaped like a dome or a tray with a handle, for supporting ice-creams, ice-lollies, yogurts and the like packaged by freezing in conventional wrappers which are substantially shaped like a truncated cone and are removable when the product is to be consumed.

It is well-known that ice-creams, ice-lollies and similar industrially-produced items are packaged by freezing in food-safe paper wrappers which are usually shaped like flattened truncated cones or truncated pyramids or are shaped like cups of various sizes.

It is also known that wrappers shaped like truncated cones or truncated pyramids are usually provided with a stick or tab which is partially inserted in the product through the larger end of the wrapper and have a portion which protrudes outside and is meant to constitute, after freezing, a means for providing support in a substantially vertical position during the removal of the paper-like wrapper from the solidified ice-cream and during its consumption.

In practice, current packages entail unpleasant drawbacks both during removal of the wrapper and during consumption which are of course caused by the fact that the supporting means is constituted only by the portion of stick or tab that protrudes from the package and is held by one hand. These drawbacks are in fact constituted by frequent damage to the solidified body of the ice-cream during removal of the protective wrapper, which usually occurs by tearing, and by even more frequent dripping produced by the slow melting which the ice-cream is subject to during the time required for its complete consumption.

In order to at least partially obviate these drawbacks and particularly the dripping of the product, frustum-shaped packages have been provided which have, at the smaller end of the wrapper, an initial collapsible portion starting from which successive squeezing produces the gradual sliding of the gelled body of the ice-cream toward the larger end of the wrapper, until part of the ice-cream protrudes from the top of said wrapper; through successive squeezing of the wrapper the user can thus eat all of the ice-cream.

Even this solution, however, does not avoid the drawback of the dripping of the product onto the hand of the consumer or in any case outside the wrapper and most of all does not allow truly full consumption of the product.

SUMMARY OF THE INVENTION

The aim of the present invention is to provide a support for ice-creams and the like packaged within paper-like wrappers of the food-safe type having a substantially frustum-like shape, conceived and structured so as to allow, in addition to reliable support of the gelled body during consumption, to constitute an advantageous means for collecting any drops of product.

Another object of the invention is to provide a support for ice-creams and the like packaged in paper-like wrappers provided with grip and supporting means which are detachably anchored to the body of the support, structured and sized so as to constitute a toy, a puppet or other object which can be removed and used to constitute, together with others, a collection which appeals particularly to children.

Another object of the invention is to provide a drip-collecting support which is easy to manufacture, is lightweight and is safely reliable in terms of rigidity and practicality in use.

This aim, these objects and others which will become apparent from the following detailed description are achieved by a support for ice-creams, ice-lollies, yogurts and the like as defined in the appended claims.

BRIEF DESCRIPTION OF THE DRAWINGS

Further characteristics and advantages of the present invention will become apparent from the following detailed description, illustrated in the accompanying drawings, given only by way of non-limitative example and wherein:

FIG. 1 is a perspective view of a conventional frustum-shaped paper-like wrapper which is filled with ice-cream or the like in the creamy state and of a drip collecting support which is executed according to the invention and shown separate from the wrapper;

FIG. 2 is a perspective view of the support according to the invention, stably anchored in the inlet of the wrapper, ready for freezing;

FIG. 3 is a partially sectional lateral view of the same assembly shown in FIG. 2 but in an inverted position and during the tearing or removal of the wrapper of the solidified ice-cream body;

FIG. 4 is a partially sectional lateral view of the same assembly shown in FIG. 2 but without the wrapper and during consumption;

FIG. 5 is a view of the support according to the invention, separated from the wrapper and from the handle; and FIG. 6 is a partially sectional enlarged-scale view of the detail of the coupling of a puppet or statuette to the tab supporting coupling.

DESCRIPTION OF THE PREFERRED EMBODIMENTS

With reference to the above figures, the support for ice-creams and the like according to the present invention is made of food-safe plastic material and is designed in particular to support ice-creams packaged within a conical wrapper 1 which is made of paper-like material and is closed by a bottom 3b of the type that is removable by separating a longitudinal flap 2 thereof along a continuous pasting line 3–3a which affects the generatrix of the conical body of the wrapper 1, as clearly shown in FIG. 3. Removal is facilitated by an external tab 4 which is normally pulled around the wrapper once the ice-cream has frozen and is kept in a vertical position, as shown in FIG. 3 and as will become apparent hereinafter.

The support for ice-creams is constituted, according to the present invention, by a dome-shaped or tray-shaped body 5 made of plastics or the like having a cambered bottom body 5a and a slightly conical circular peripheral rim 5b, i.e., a rim whose taper is substantially equal to the inlet taper 6 (FIG. 1) of the wrapper 1.

A rigid tab 7 is anchored in a central position to a bottom body 5a of the dome 5 and is meant to be immersed in a creamy ice-cream 8 (FIG. 1) when the tray or dome 5 is inserted, like a plug, into a mouth 6 of the wrapper and stopped when its internal bottom 5a makes contact with the ice-cream 8, as will become apparent hereinafter. A circular seat 9 is formed in the body of the dome 5a (FIGS. 5 and 6); a peripheral rim 9a of said seat 9 has a smaller diameter than the seat itself, and constitutes an undercut element which allows a disk 10, which supports a handle constituted for example by a statuette or puppet 11, to be detachably anchored in a snap-on manner within the seat 9. The detachable anchoring allows, by utilizing the elasticity of the plastic material, to remove the handle, which can thus have an independent role with respect to the tray 5. In this case, the handle can be constituted by objects which are capable of inviting children, in particular, to collect various objects.

In practice, the dome-like support 5 and the corresponding tab 4 are used as follows.

After filling the wrapper 1, which is closed as shown in FIG. 1, with ice-cream 8 or with another product in the soft or creamy state, the support with the corresponding handle is inserted in the inlet 6 of the wrapper so as to insert the tab 7 in the ice-cream and make the bottom 5a of the tray adhere to the internal surface of said ice-cream. The insertion of the tray in the wrapper 1 allows its peripheral conical rim 5b to adhere to the conical wall of the rim 6 of the wrapper, thus forming the seal. The assembly constituted by the support inserted in the wrapper 1 and by the tab 7 immersed in the mass of ice-cream is then frozen, so that the tab 7 remains stably anchored to the hardened mass (FIG. 2).

At consumption time it is sufficient to remove the wrapper 1, preferably by keeping it inverted, i.e., with the support downward as shown by FIG. 2, and acting on the external tab 4 so as to separate the flap 2 from the pasting region 3 and then remove the entire wrapper without breaking or tearing it.

The ice-cream, after removing the wrapper, has the appearance shown in FIG. 4 and can therefore be eaten even slowly, since any drops 12, which are practically inevitable, collect in the underlying tray 5.

After eating, the buyer-consumer can remove the handle 11 from the dome and use it separately if deemed necessary.

The present invention allows to achieve the intended aim and objects, i.e., assured stability of the body of the ice-cream during eating, collection of any drops, and separate use of the handle when said handle is of interest to the consumer.

Finally, it is evident that the above-described invention is susceptible of variations as to the type and dimensions of the support in relation to the dimensions of the wrapper, as to the colors of the wrapper and of the support and as to the type of shape, size and colors of the handle without abandoning the scope of the present invention.

What is claimed is:

1. A support for a frozen confection which frozen confection is packaged in a wrapper wherein the wrapper is shaped like a cone or a truncated cone and is open only at its larger end and wherein the wrapper is removable from the frozen confection by tearing; said support comprising, when oriented for its function as a support, a tray shaped body with an outwardly extending annular wall portion and an annular rim extending up from the outwardly extending wall portion with said annular peripheral rim shaped like a truncated cone; said outwardly extending annular wall portion defining a drip chamber for any drippings from said frozen confection; the said annular peripheral rim dimensioned to fit into said open end of said wrapper to constitute a plug and close the open end and to be sealingly secured to said wrapper at said open end; said support further comprising a tab centrally located within the tray shaped body and extending from the inner surface of the tray shaped body a distance away from the inner surface of the tray sufficient to be immersed in and stably anchored to said frozen confection; the uppermost part of said annular peripheral rim being wider than the end of the frozen product associated with said larger end of said wrapper; said tray-shaped body having an outer face opposite said inner surface which outer face is centrally provided with a cavity having a peripheral insertion rim forming an undercut; said support further comprising a handle means comprising a disc shaped body and a hand holdable handle portion attached to said disc, said handle portion being shaped as a figurine or toy; said cavity being circular with said peripheral rim having a diameter smaller than the diameter of the cavity; said disc being dimensioned to be accommodated in said cavity to provide a detachable snap-on engagement of said handle means to said tray-shaped body so that after the frozen confection is consumed, the handle means including the figurine or toy can be detached from the disc shaped body.

2. The support according to claim 1, wherein said handle portion is shaped like a puppet.

\* \* \* \* \*